(12) United States Patent
Li et al.

(10) Patent No.: US 11,458,987 B2
(45) Date of Patent: Oct. 4, 2022

(54) DRIVER-CENTRIC RISK ASSESSMENT: RISK OBJECT IDENTIFICATION VIA CAUSAL INFERENCE WITH INTENT-AWARE DRIVING MODELS

(71) Applicant: Honda Motor Co., Ltd., Tokyo (JP)

(72) Inventors: Chengxi Li, West Lafayette, IN (US); Yi-Ting Chen, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 91 days.

(21) Appl. No.: 17/005,833

(22) Filed: Aug. 28, 2020

(65) Prior Publication Data
US 2021/0261148 A1 Aug. 26, 2021

Related U.S. Application Data

(63) Continuation-in-part of application No. 16/916,428, filed on Jun. 30, 2020.
(Continued)

(51) Int. Cl.
*B60W 50/00* (2006.01)
*B60W 50/14* (2020.01)
(Continued)

(52) U.S. Cl.
CPC ........ *B60W 50/14* (2013.01); *B60W 50/0097* (2013.01); *G06N 3/04* (2013.01);
(Continued)

(58) Field of Classification Search
CPC ............. B60W 50/14; B60W 50/0097; B60W 2554/20; B60W 2554/40; G06N 3/04;
(Continued)

(56) References Cited

U.S. PATENT DOCUMENTS 11,205,082 B2 * 12/2021 Adeli-Mosabbeb .... H04W 4/40
2018/0118264 A1 * 5/2018 Adiprasito ......... B62D 15/0265
(Continued)

FOREIGN PATENT DOCUMENTS

EP 2654028 B1 * 9/2018 ............. G08G 1/166
JP 2019-207464 12/2019

OTHER PUBLICATIONS

He at al, Mask R-CNN, 2017 ICCV, pp. 2961-2969 (Year: 2017).*
(Continued)

*Primary Examiner* — Nancy Bitar
*Assistant Examiner* — Xiao Liu
(74) *Attorney, Agent, or Firm* — Rankin, Hill & Clark LLP

(57) ABSTRACT

A system and method for predicting driving actions based on intent-aware driving models that include receiving at least one image of a driving scene of an ego vehicle. The system and method also include analyzing the at least one image to detect and track dynamic objects located within the driving scene and to detect and identify driving scene characteristics associated with the driving scene and processing an ego-thing graph associated with the dynamic objects and an ego-stuff graph associated with the driving scene characteristics. The system and method further include predicting a driver stimulus action based on a fusion of representations of the ego-thing graph and the ego-stuff graph and a driver intention action based on an intention representation associated with driving intentions of a driver of the ego vehicle.

20 Claims, 7 Drawing Sheets

Related U.S. Application Data

(60) Provisional application No. 62/981,785, filed on Feb. 26, 2020.

(51) Int. Cl.
*G06N 3/04* (2006.01)
*G06V 20/56* (2022.01)

(52) U.S. Cl.
CPC .......... *G06V 20/56* (2022.01); *B60W 2554/20* (2020.02); *B60W 2554/40* (2020.02)

(58) Field of Classification Search
CPC ...... G06V 20/56; G06V 10/454; G06V 20/58; G06V 20/582; G06V 20/584; G06V 20/588; G06K 9/6271; G06K 9/629; G06K 9/6296; G06T 2207/20072; G06T 2207/20081; G06T 2207/20084; G06T 2207/30261; G06T 7/246; G06T 7/11
See application file for complete search history.

(56) References Cited

U.S. PATENT DOCUMENTS

2018/0253622 A1    9/2018    Chen et al.
2021/0171061 A1    6/2021    Etesami

OTHER PUBLICATIONS

Yoneda et al, Convolutional neural network based vehicle turn signal recognition, 2017 International Conference on Intelligent Informatics and Biomedical Sciences (ICIIBMS), pp. 204-205 (Year: 2017).*

J. L. Ba, J. R. Kiros, and G. E. Hinton, "Layer Normalization," in arXiv preprint arXiv:1607.06450, 2016.

J. Carreira and A. Zisserman, "Quo Vadis, Action Recognition? A New Model and the Kinetics Dataset," in IEEE Conference on Computer Vision and Pattern Recognition, 2017.

C. Chen, A. Seff, A. Kornhauser, and J. Xiao, "DeepDriving: Learning Affordance for Direct Perception in Autonomous Driving," in IEEE International Conference on Computer Vision, 2015.

F. Codevilla, M. Müller, A. López, V. Koltun, and A. Dosovitskiy, "End-to-end driving via conditional imitation learning," in IEEE International Conference on Robotics and Automation, 2018.

M. Cordts, M. Omran, S. Ramos, T. Rehfeld, M. Enzweiler, R. Benenson, U. Franke, S. Roth, and B. Schiele, "The Cityscapes Dataset for Semantic Urban Scene Understanding," in IEEE Conference on Computer Vision and Pattern Recognition, 2016.

R. De Geest, E. Gavves, A. Ghodrati, Z. Li, C. Snoek, and T. Tuytelaars, "Online action detection," in IEEE European Conference on Computer Vision, 2016.

A. Doshi and M. Trivedi, "Tactical Driver Behavior Prediction and Intent Inference: A Review," in International IEEE Conference on Intelligent Transportation Systems, 2011.

A. Geiger, P. Lenz, and R. Urtasun, "Are We Ready for Autonomous Driving? The KITTI Vision Benchmark Suite," in IEEE Conference on Computer Vision and Pattern Recognition, 2012.

K. He, G. Gkioxari, P. Dollar, and R. Girshick, "Mask R-CNN," in IEEE Conference on Computer Vision and Pattern Recognition, 2017.

S. Hochreiter and J. Schmidhuber, "Long Short-term Memory," Neural computation, 1997.

A. Jain, H. S. Koppula, B. Raghavan, S. Soh, and A. Saxena, "Car that Knows Before You Do: Anticipating Maneuvers via Learning Temporal Driving Models," in IEEE International Conference on Computer Vision, 2015.

D. Jayaraman and K. Grauman, "Learning Image Representations Tied to Egomotion from Unlabeled Video," International Journal of Computer Vision, vol. 125, No. 1, pp. 136-161, 2017. [Online]. Available: https://doi.org/10.1007/s11263-017-1001-2.

W. Kay, J. Carreira, K. Simonyan, B. Zhang, C. Hillier, S. Vijayanarasimhan, F. Viola, T. Green, T. Back, P. Natsev, M. Suleyman, and A. Zisserman, "The Kinetics Human Action Video Dataset," in arXiv preprint arXiv:1705.06950, 2017.

J. Kim and J. Canny, "Interpretable Learning for Self-driving Cars by Visualizing Causal Attention," in IEEE International Conference on Computer Vision, 2017.

J. Kim, T. Misu, Y.-T. Chen, A. Tawari, and J. Canny, "Grounding Human-to-vehicle Advice for Self-driving Vehicles," in IEEE Conference on Computer Vision and Pattern Recognition, 2019.

D. P. Kingma and J. Ba, "Adam: A Method for Stochastic Optimization," in arXiv preprint arXiv:1412.6980, 2014.

T. N. Kipf and M. Welling, "Semi-supervised Classification with Graph Convolutional Networks," in IEEE International Conference on Learning Representations, 2017.

K. Lasinger, R. Ranftl, K. Schindler, and V. Koltun, "Towards Robust Monocular Depth Estimation: Mixing Datasets for Zero-Shot Cross-Dataset Transfer," in arXiv preprint arXiv:1907.01341, 2019.

S. Lefèvre, C. Laugier, and J. Ibañez-Guzmán, "Intention-aware risk estimation for general traffic situations, and application to intersection safety," 2013.

C. Li, S. H. Chan, and Y.-T. Chen, "Who make drivers stop? towards driver-centric risk assessment: Risk object identification via causal inference," arXiv preprint arXiv:2003.02425, 2020.

C. Li, Y. Meng, S. H. Chan, and Y.-T. Chen, "Learning 3D-aware Egocentric Spatial-Temporal Interaction via Graph Convolutional Networks," in IEEE International Conference on Robotics and Automation, 2020.

T.-Y. Lin, M. Maire, S. Belongie, J. Hays, P. Perona, D. Ramanan, P. Dollár, and C. L. Zitnick, "Microsoft COCO: Common Objects in Context," in IEEE European Conference on Computer Vision, 2014.

G. Liu, a. K. J. S. Fitsum A. Reda, T.-C. Wang, A. Tao, and B. Catanzaro, "Image Inpainting for Irregular Holes using Partial Convolutions," in IEEE European Conference on Computer Vision, 2018.

G. Liu, K. J. Shih, T.-C. Wang, F. A. Reda, K. Sapra, Z. Yu, A. Tao, and B. Catanzaro, "Partial Convolution based Padding," arXiv preprint arXiv:1811.11718, 2018.

W. Maddem, G. Pascoe, C. Linegar, and P. Newman, "1 Year, 1000km: The Oxford RobotCar Dataset," The International Journal of Robotics Research, vol. 36, No. 1, pp. 3-15, 2017.

V. Madhavan and T. Darrell, "The BDD-Nexar Collective: A Large-Scale, Crowsourced, Dataset of Driving Scenes," Master's thesis, EECS Department, University of California, Berkeley, May 2017. [Online]. Available: http://www2.eecs.berkeley.edu/Pubs/TechRpts/2017/EECS-2017-113.html.

J. A. Michon, "A Critical View of Driver Behavior Models: What Do We Know, What Should We Do?" Human Behavior and Traffic Safety, pp. 485-520, 1985.

T. Misu and Y.-T. Chen, "Toward Reasoning of Driving Behavior," in International IEEE Conference on Intelligent Transportation Systems, 2019.

A. Narayanan, Y.-T. Chen, and S. Malla, "Semi-supervised Learning: Fusion of Self-supervised, Supervised Learning, and Multimodal Cues for Tactical Driver Behavior Detection," in IEEE Conference on Computer Vision and Pattern Recognition Workshop, 2018.

N. Oliver and A. Pentland, "Graphical Models for Driver Behavior Recognition in a SmartCar," in IEEE Intelligent Vehicles Symposium, 2000.

V. Ramanishka, Y.-T. Chen, T. Misu, and K. Saenko, "Toward Driving Scene Understanding: A Dataset for Learning Driver Behavior and Causal Reasoning," in IEEE Conference on Computer Vision and Pattern Recognition, 2018.

A. Rahimpour, S. Martin, A. Tawari, and H. Qi, "Context aware road-user importance estimation (icare)," in IEEE Intelligent Vehicles Symposium, 2019.

J. Redmon, S. Diwala, R. Girshick, and A. Farhadi, "You Only Look Once:Unified, Real-Time Object Detection," in IEEE Conference on Computer Vision and Pattern Recognition, 2016.

(56) References Cited

OTHER PUBLICATIONS

S. Ren, K. He, R. Girshick, and J. Sun, "Faster R-CNN: Towards Real-Time Object Detection with Region Proposal Networks," in IEEE Conference on Neural Information Processing Systems, 2015.
O. Russakovsky, J. Deng, H. Su, J. Krause, S. Satheesh, S. Ma, Z. Huang, A. Karpathy, A. Khosla, M. Bernstein, A. C. Berg, and L. Fei-Fei, "ImageNet LargeScale Visual Recognition Challenge," in International Journal of Computer Vision, 2015.
E. Santana and G. Hotz, "Learning a Driving Simulator," CoRR, vol. abs/1608.01230, 2016.
C. Szegedy, V. Vanhoucke, S. Ioffe, J. Shlens, and Z. Wojna, "Rethinking the Inception Architecture for Computer Vision," in IEEE Conference on Computer Vision and Pattern Recognition, 2016.
S. M. Ashish Tawari, Praneeta Mallela, "Learning to Attend to Salient Targets in Driving Videos using Fully Convolutional RNN," in IEEE Intelligent Transportation Systems Conference, 2018.
D. Wang, C. Devin, Q.-Z. Cai, P. Krähenbühl, and T. Darrell, "Monocular plan view networks for autonomous driving," in International Conference on Intelligent Robots and Systems, 2019.
D. Wang, C. Devin, Q.-Z. Cai, F. Yu, and T. Darrell, "Deep Object Centric Policies for Autonomous Driving," in IEEE International Conference on Robotics and Automation, 2019.
X. Wang and A. Gupta, "Videos as Space-Time Region Graphs," in IEEE European Conference on Computer Vision, 2018.
J. Wu, L. Wang, L. Wang, J. Guo, and G. Wu, "Learning Actor Relation Graphs for Group Activity Recognition," in IEEE Conference on Computer Vision and Pattern Recognition, 2019.
Y. Xia, D. Zhang, J. Kim, and D. W. Ken Nakayama, Karl Zipser, "Predicting Driver Attention in Critical Situations," in Asian Conference on Computer Vision, 2018.
H. Xu, Y. Gao, F. Yu, and T. Darrell, "End-to-End Learning of Driving Models From Large-Scale Video Datasets," in IEEE Conference on Computer Vision and Pattern Recognition, 2016.
M. Xu, M. Gao, Y.-T. Chen, L. Davis, and D. Crandall, "Temporal Recurrent Networks for Online Action Detection," in IEEE International Conference on Computer Vision, 2019.
S. Yan, Y. Xiong, and D. Lin, "Spatial Temporal Graph Convolutional Networks for Skeleton-Based Action Recognition," in Conference on Artificial Intelligence, 2018.
Z. Zhang, C. Yu, and D. Crandall, "A Self Validation Network for Object-Level Human Attention Estimation," in IEEE Conference on Neural Information Processing Systems, 2019.
H. Zhao, J. Shi, X. Qi, X. Wang, and J. Jia, "Pyramid Scene Parsing Network," in IEEE Conference on Computer Vision and Pattern Recognition, 2017.
A. Narayanan, A. Siravuru, and B. Dariush, "Temporal multi-modal fusion for driver behavior prediction tasks using gated recurrent fusion units," arXiv preprint arXiv:1910.00628, 2019.
https://pytorch.org/.
https://github.com/pascalxia/driver_attention_prediction.
S. Alletto, A. Palazzi, F. Solera, S. Calderara, and R. Cucchiara. DR(eye)VE: A Dataset for Attention-based Tasks with Applications to Autonomous and Assisted Driving. In CVPRW, 2016.
M. Bojarski, D. D. Testa, D. Dworakowski, B. Firner, B. Flepp, P. Goyal, L. D. Jackel, M. Monfort, U. Muller, J. Zhang, X. Zhang, J. Zhao, and K. Zieba. End to End Learning for Self-Driving Cars. In arXiv preprint arXiv:1604.07316, 2016.

F. Codevilla, E. Santana, A. López, and A. Gaidon. Exploring the Limitations of Behavior Cloning for Autonomous Driving. In arXiv preprint arXiv:1904.08980, 2019.
P. de Haan, D. Jayaraman, and S. Levine. Causal Confusion in Imitation Learning. In NeurIPS, 2019.
M. Gao, A. Tawari, and S. Martin. Goal-oriented Object Importance Estimation in On-road Driving Videos. In ICRA, 2019.
R. Girshick, I. Radosavovic, G. Gkioxari, P. Dollár, and K. He. Detectron. https://github.com/facebookresearch/detectron, 2018.
J. Hawke, R. Shen, C. Gurau, S. Sharma, D. Reda, N. Nikolov, P. Mazur, S. Micklethwaite, N. Griffiths, A. Shah, and A. Kendall. Urban Driving with Conditional Imitation Learning. In arXiv preprint arXiv:1912.00177, 2019.
T. Jayram, T. Kornuta, V. Albouy, E. Sevgen, and A. Ozcan. Learning Multi-Step Spatio-Temporal Reasoning with Selective Attention Memory Network. In NeurIPS, 2019.
N. R. Ke, O. Bilaniuk, A. Goyal, S. Bauer, H. Larochelle, C. Pal, and Y. Bengio. Learning Neural Causal Models from Unknown Interventions. In arXiv preprint arXiv:1910.01075, 2019.
S. Lefèvre, D. Vasquez, and C. Laugier. A survey on motion prediction and risk assessment for intelligent vehicles. Robomech Journal, 1:1, 2014.
S. Nair, Y. Zhu, S. Savarese, and L. Fei-Fei. Causal Induction from Visual Observations for Goal Directed Tasks. In NeurIPS 2019 Workshop on Causal Machine Learning, 2019.
A. Rahimpour, S. Martin, A. Tawari, and H. Qi. Context Aware Road-user Importance Estimation (iCARE). In IV, 2019.
N. Srivastava, G. Hinton, A. Krizhevsky, I. Sutskever, and R. Salakhut-dinov. Dropout: A Simple Way to Prevent Neural Networks from Overfitting. JMLR, 2014.
C. Szegedy, S. Ioffe, V. Vanhoucke, and A. A. Alem. Inception-v4, Inception-ResNet and the Impact of Residual Connections on Learning. In AAAI, 2017.
N. Wojke, A. Bewley, and D. Paulus. Simple Online and Realtime Tracking with a Deep Association Metric. In ICIP, 2017.
F. Yu, W. Xian, Y. Chen, F. Liu, M. Liao, V. Madhavan, and T. Darrell. BDD100K: A Diverse Driving Video Database with Scalable Annotation Tooling. In arXiv preprint arXiv:1805.04687, 2018.
K.-H. Zeng, S.-H. Chou, F.-H. Chan, J. C. Niebles, and M. Sun. Agent-Centric Risk Assessment: Accident Anticipation and Risky Region Localization. In CVPR, 2017.
Office Action of U.S. Appl. No. 16/916,428 dated Oct. 26, 2021, 36 pages.
R. Izquierdo et al. "Experimental validation of lane-change intention prediction methodologies based on CNN and LSTM." 2019 IEEE Intelligent Transportation Systems Conference (ITSC), IEEE 2019, Oct. 30, 2019. https://ieeexplore.ieee.org/document/8917331.
Patrick Gebert et al. "End-to-end Prediction of Driver Intention using 3D Convolutional Neural Networks," 2019 IEEE Intelligent Vehicles Symposium (IV), IEEE Dec. 12, 2019. https://ieeexplore.ieee.org/document /8814249.
Dai et al., Instance-aware Semantic Segmentation via Multi-task Network Cascades, 2016 CVPR, pp. 3150-3158 (Year: 2016).
Office Action of U.S. Appl. No. 16/916,428 dated Feb. 1, 2022, 23 pages.
Yurtsever et al., Risky Action Recognition in Lane Change Video Clips using Deep Spatiotemperal Networks with Segmentation Mask Transfer, arXiv:1906.02859v2 (Year: 2020).
Office Action of U.S. Appl. No. 16/916,428 dated May 16, 2022, 26 pages.

* cited by examiner

DRIVER-CENTRIC RISK ASSESSMENT: RISK OBJECT IDENTIFICATION VIA CAUSAL INFERENCE WITH INTENT-AWARE DRIVING MODELS

CROSS-REFERENCE TO RELATED APPLICATION

This application is a continuation-in-part of U.S. application Ser. No. 16/916,428 filed on Jun. 30, 2020, which claims priority to each of U.S. Provisional Application, Ser. No. 62/981,785 filed on Feb. 26, 2020, both of which are expressly incorporated herein by reference.

BACKGROUND

Studying driver-centric risks requires an acute understanding of a driving scenes. Data collection and analysis has not addressed many of the challenges of higher level driving scene understanding. In intelligent automated driving systems, it may be crucial to enable systems with such ability. To achieve the ultimate goal, existing works for risk object identification includes labeling risk objects in a noisy and time consuming fashion by receiving numerous inputs while utilizing high amounts of processing power and provide no explicit reasoning for identifying risk objects.

BRIEF DESCRIPTION

According to one aspect, a computer-implemented method for predicting driving actions based on intent-aware driving models that includes receiving at least one image of a driving scene of an ego vehicle. The computer-implemented method also includes analyzing the at least one image to detect and track dynamic objects located within the driving scene and to detect and identify driving scene characteristics associated with the driving scene and processing an ego-thing graph associated with the dynamic objects and an ego-stuff graph associated with the driving scene characteristics. The computer-implemented method further includes predicting a driver stimulus action based on a fusion of representations of the ego-thing graph and the ego-stuff graph and a driver intention action based on an intention representation associated with driving intentions of a driver of the ego vehicle.

According to another aspect, a system for predicting driving actions based on intent-aware driving models that includes a memory storing instructions when executed by a processor cause the processor to receive at least one image of a driving scene of an ego vehicle. The instructions also cause the processor to analyze the at least one image to detect and track dynamic objects located within the driving scene and to detect and identify driving scene characteristics associated with the driving scene and process an ego-thing graph associated with the dynamic objects and an ego-stuff graph associated with the driving scene characteristics. The instructions further cause the processor to predict a driver stimulus action based on a fusion of representations of the ego-thing graph and the ego-stuff graph and a driver intention action based on an intention representation associated with driving intentions of a driver of the ego vehicle.

According to yet another aspect, non-transitory computer readable storage medium storing instructions that when executed by a computer, which includes a processor perform a method that includes receiving at least one image of a driving scene of an ego vehicle. The method also includes analyzing the at least one image to detect and track dynamic objects located within the driving scene and to detect and identify driving scene characteristics associated with the driving scene and processing an ego-thing graph associated with the dynamic objects and an ego-stuff graph associated with the driving scene characteristics. The method further includes predicting a driver stimulus action based on a fusion of representations of the ego-thing graph and the ego-stuff graph and a driver intention action based on an intention representation associated with driving intentions of a driver of the ego vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
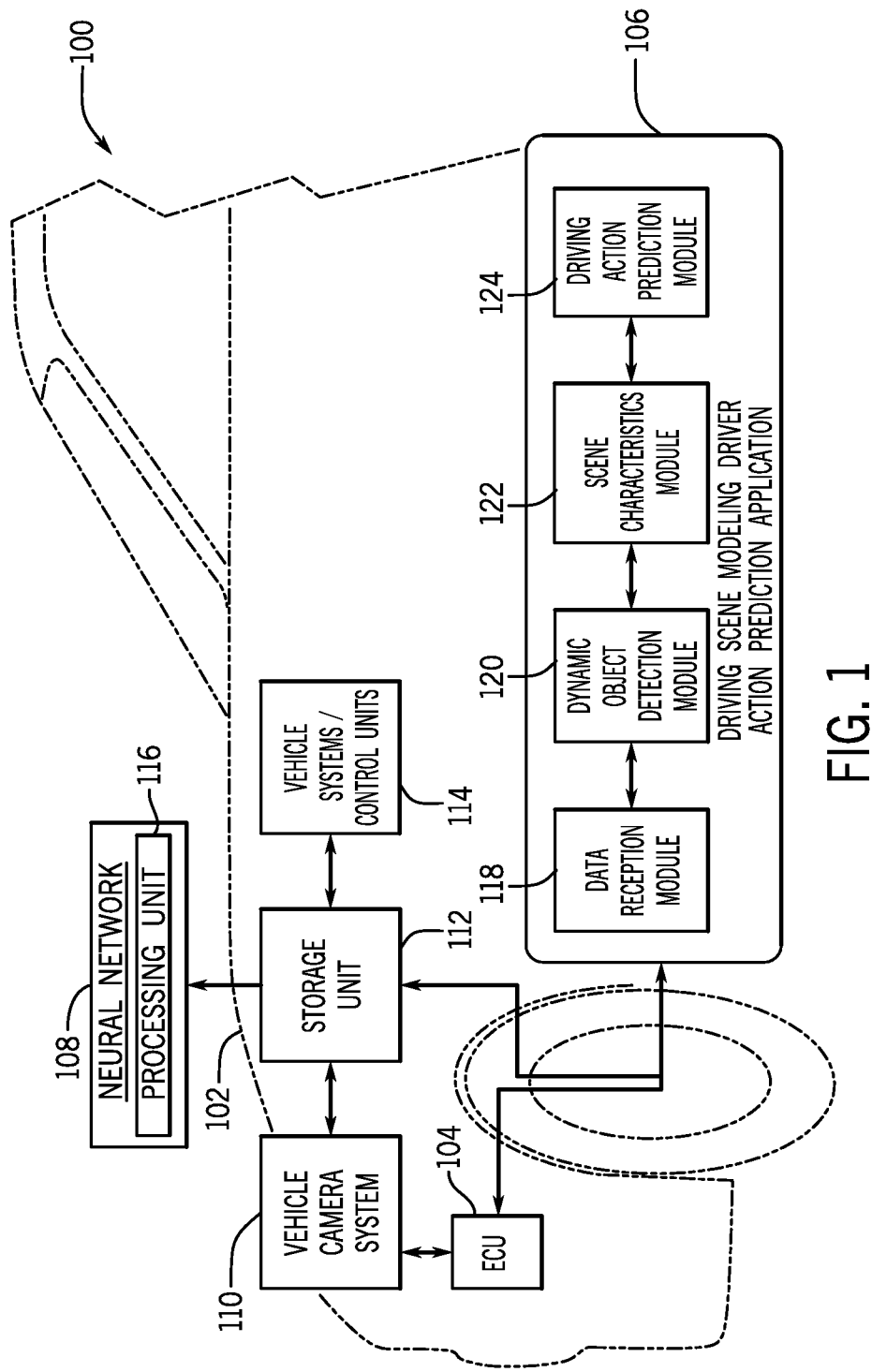
FIG. 1 is a schematic view of an exemplary system for predicting driving actions based on intent-aware driving models according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for predicting driving actions based on intent-aware driving models according to an exemplary embodiment of the present disclosure. The components of the system 100, as well as the components of other systems, hardware architectures, and software architectures discussed herein, may be combined, omitted, or organized into different architectures for various embodiments.

Generally the system 100 may include an ego vehicle 102. The ego vehicle 102 may include, but may not be limited to, an automobile, a robot, a forklift, a bicycle/motor bike, a wheel chair/scooter, and the like that may be traveling within one or more types of environments. For purposes of simplicity, this disclosure will describe the embodiments of the system 100 with respect to an ego vehicle 102 as a passenger vehicle (e.g., car). The ego vehicle 102 includes an electronic control unit (ECU) 104 that executes one or more applications, operating systems, ego vehicle system and subsystem user interfaces, among others. The ECU 104 may execute a driving scene modeling driver action prediction application (action prediction application) 106 that may be configured to predict driving actions based on intent-aware driving models according to an exemplary embodiment of the present disclosure.

As discussed in more detail below, the action prediction application 106 may be configured to utilize a neural network 108 with machine learning and deep learning to provide artificial intelligence capabilities that maybe utilized to build and maintain a naturalistic driving behavior data set (not shown) with annotations associated with a multi-layer annotation scheme. The action prediction application 106 may process information from various sources provided as inputs and may utilize the neural network 108 to provide various functions, that may include, but may not be limited to computer vision, object classification, feature recognition, multilayer perceptions, and autonomous driving commands.

The multi-layer annotation scheme may be utilized to include classes of driving processes that include, but may not be limited to, an operational process that corresponds to the manipulation of the ego vehicle 102, a tactical process that includes interactions between the ego vehicle 102, traffic participants, and the surrounding environment of the ego vehicle 102, and a strategic process for higher level reasoning, planning, and decision making. In an exemplary embodiment, the multi-layer annotation scheme may include the categorization of one or more driving maneuvers as a goal-oriented action that may include the driver's manipulation(s) of the ego vehicle 102 in a navigation task (e.g., right turn) that may be based on a driver's possible intent to conduct the driving maneuver(s). The multi-layer annotation scheme may include the categorization of one or more driving maneuvers as a stimulus-driven action (e.g., stopping the ego vehicle 102) that may be indicative of a reason (due to a driver's reaction to) or one or more external stimuli to conduct the driving maneuver(s).

The multi-layer annotation scheme may also include a determination of causal reasoning of the one or more driving maneuvers classified as stimulus-driven actions to explain the reasoning for the driver's actions when conducting the one or more driving maneuvers (e.g., a stopped car in front of the ego vehicle 102 is an immediate cause for stopping the ego vehicle 102). Additionally, the multi-layer annotation scheme may include the determination of driver actions associated with one or more attention capturing traffic related objects that may be attended to by the driver as the driver conducts the one or more driving maneuvers (e.g., a yellow traffic light and a pedestrian that may be attended by the driver of the ego vehicle 102).

As discussed in more detail below, the action prediction application 106 may be configured to predict stimulus driven actions and driver intention actions associated with the operation of the ego vehicle 102 based on the determination of causal reasoning of the one or more driving maneuvers classified as stimulus-driven actions and one or more attention capturing traffic related objects that may be attended to by the driver as the driver conducts the one or more driving maneuvers. The causal reasoning and attention captured traffic related objects may be based on one or more dynamic objects that may be located within a driving scene of the ego vehicle 102 and/or one or more driving scene characteristics that may be included within the driving scene of the ego vehicle 102. The driving scene may include a predetermined vicinity of the ego vehicle 102 as the ego vehicle 102 is being operated.

In particular, the action prediction application 106 may be configured to analyze the images to model a spatial-temporal driving scene of the ego vehicle 102. The action prediction application 106 may be configured to analyze the images to further analyze the driving scene of the ego vehicle 102 to detect and track the dynamic objects traveling within the driving scene and to detect and identify the driving scene characteristics of the driving scene. In one embodiment, the dynamic objects may include traffic participants that may be located within the surrounding environment of the ego vehicle 102 and may include, but may not be limited to, additional vehicles, pedestrians, bicyclists, and the like. The driving scene characteristics may include, but may not be limited to, road markings (e.g., lane makings, cross walks) included upon roadways within the driving scene, traffic lights, traffic signs, roadway configuration (e.g., intersection, ON/OFF ramp, merge lane), and the like included within the driving scene of the ego vehicle 102.

Figure 2:
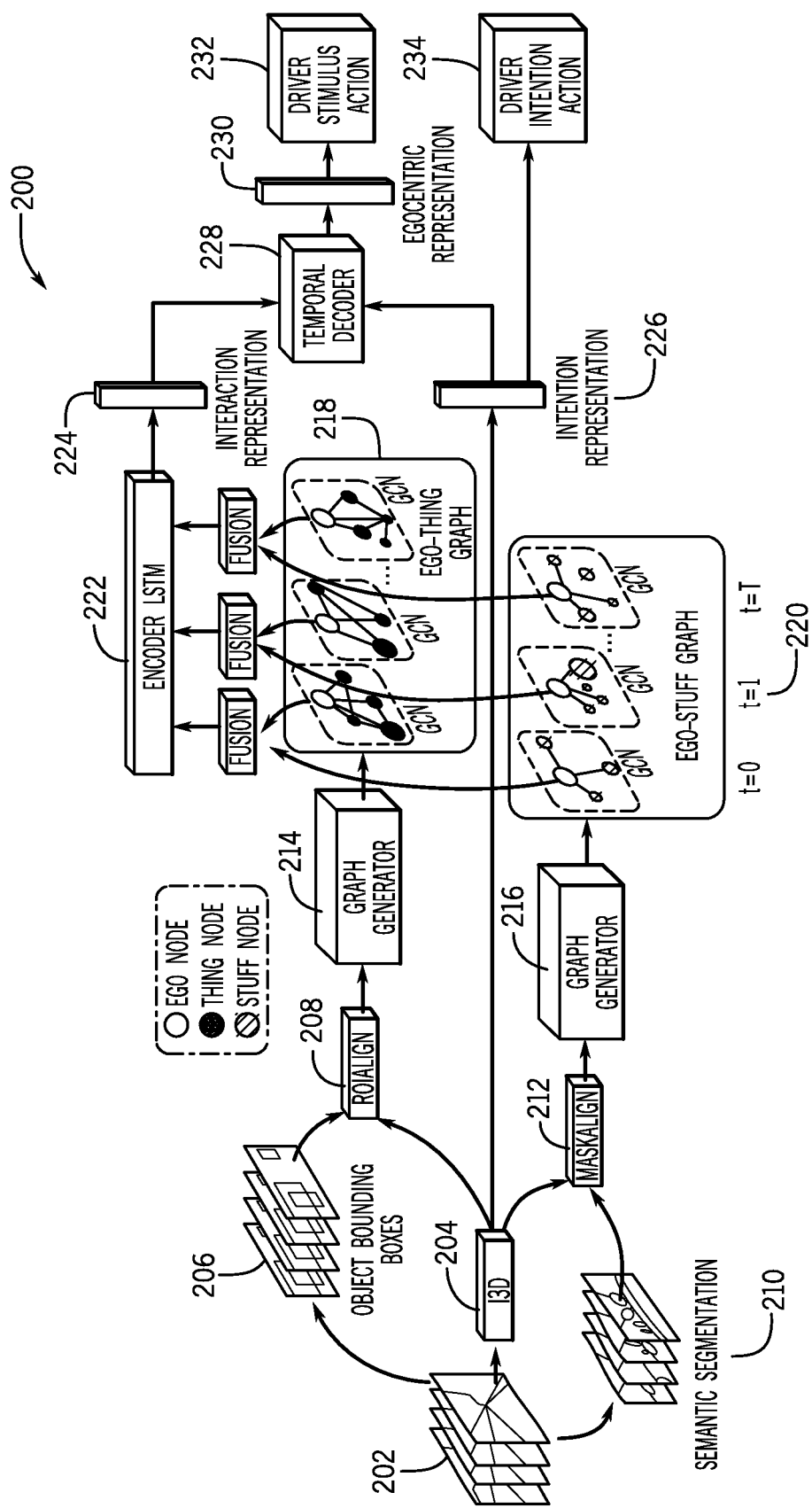
FIG. 2 is an exemplary framework of an operation of an action prediction application and a neural network according to an exemplary embodiment of the present disclosure.

With reference to FIG. 2, a framework 200 of the operation of the action prediction application 106 and the neural network 108, in one configuration, the action prediction application 106 may be configured to utilize the neural network 108 to receive inputs of image frames 202 of egocentric views of the driving scene and to execute machine learning/deep learning processing to perform I3D convolutions by way of an inflated 3D convolutional block using an I3D head (I3D) 204 to the image frames 202 of the surrounding environment of the ego vehicle 102. Additionally, the I3D convolutions may be applied to extract visual features from the image frames 202. The neural network 108 may apply ROIAlign 208 to extract dynamic object features from computed object bounding boxes 206 associated with dynamic objects located within the surrounding environment of the ego vehicle 102 as captured within the image frames 202. The neural network 108 may also apply MaskAlign 212 to extract features of irregular shaped objects from semantic masks based on semantic segmentation 210 of the image frames 202.

As discussed below, the action prediction application 106 may utilize the neural network 108 to execute a graph generator 214 to receive data from the ROIAlign 208 and construct an ego-thing graph 218 that is designed to model interactions among the ego vehicle 102 and the dynamic objects within the driving scene. The dynamic objects may be classified as ego-things located within the driving scene of the ego vehicle 102 that cause the operation of the ego vehicle 102 and/or dynamic objects to be changed based on their location, presence, and/or movement within the driving scene.

The action prediction application 106 may also utilize the neural network 108 to execute a graph generator 216 to receive data from the MaskAlign 212 and construct an ego-stuff graph 220 that pertains to characteristics of the driving scene such as static objects and roadway features including, but not limited to, cross walks, lane markings, lane separators, road barriers, service lanes, traffic islands, traffic lights, and traffic signage, and the like. The characteristics of the driving scene may be classified as ego-stuff that are not influenced by the ego vehicle 102, dynamic objects, and/or one another.

In particular, the criterion used to distinguish the driving scene characteristics classified as stuff-objects associated with the ego-stuff graph 220 from the dynamic objects classified as thing-objects associated with the ego-thing graph 218 may be based on whether the change of states may be caused by bi-directional influence. In other words, dynamic objects may be classified as ego-things since their presence has an influence on one another as a stimulus for stopping, merging, turning, and the like such that the presence of one dynamic object may be influence a driving maneuver of another dynamic object and/or the ego vehicle 102.

As an example, one or more dynamic objects and/or the ego vehicle 102 may change its state from 'go' to 'stop' based on the presence of the one or more additional dynamic objects stopping, crossing, merging, and/or turning within the driving scene. Alternatively, driving scene characteristics such as static objects located within the driving scene may be classified as stuff-objects since they are not influenced by one another or additional objects. For example, an operation of a traffic light switching from green to yellow to red is independently caused by electrical operation of a controller (not shown) of the traffic light and not caused by the presence of objects.

In one embodiment, the outputs of the two graphs 218, 220 may be fused and fed into an encoder LSTM module (encoder LSTM) 222 to form an interaction representation 224 of the driving scene. Additionally, the neural network 108 may be configured to utilize the I3D convolutions to output an intention representation 226 associated with driving intentions of a driver of the ego vehicle 102 performing one or more driving maneuvers. The interaction representation 224 and the intention representation 226 may be aggregated via a temporal decoder 228 that uses temporal recurrent networks as an input to predict driver stimulus action 232 that pertains to driving maneuvers that are associated with a particular external stimulus that is included within the driving scene. The neural network 108 may also enable a prediction of a driver intention action 234 associated with driver intentions based on the intention representation 226 of extracted visual features of the driving scene.

Referring again to FIG. 1, in addition to the ECU 104, the ego vehicle 102 may also include a plurality of components, including a vehicle camera system 110 a storage unit 112, and vehicle systems/control units 114. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102. The ECU 104 may also include a communication device (not shown) for sending data internally within (e.g., between one or more components) the ego vehicle 102 and communicating with externally hosted computing systems (e.g., external to the ego vehicle 102).

The vehicle camera system 110 may include one or more of the cameras (not shown) that may be positioned in one or more directions and at one or more areas to capture one or more images of the surrounding environment of the ego vehicle 102 (e.g., images of the roadway on which the ego vehicle 102 is traveling). The one or more cameras of the vehicle camera system 110 may be disposed at external front portions of the ego vehicle 102, including, but not limited to different portions of the ego vehicle dashboard, ego vehicle bumper, ego vehicle front lighting units, ego vehicle fenders, and the windshield. In one embodiment, the one or more cameras may be configured as RGB cameras that may capture RGB video/images. The one or more cameras may be configured to capture rich information about object appearance, as well as interactions between the ego vehicle 102 and the dynamic objects within the surrounding environment of the ego vehicle 102.

In other embodiments, the one or more cameras may be configured as stereoscopic cameras that are configured to capture environmental information in the form three-dimensional images. In one or more configurations, the one or more cameras may be configured to capture the driving scene of the ego vehicle 102 as RGB images/videos. The vehicle camera system 110 may be configured to convert one or more RGB images/videos (e.g., sequences of images) into image data that is communicated to the action prediction application 106 to be analyzed.

Generally, the ECU 104 may communicate with the storage unit 112 to execute the one or more applications, operating systems, ego vehicle system and subsystem user interfaces, and the like that are stored within the storage unit 112. In one or more embodiments, the storage unit 112 of the ego vehicle 102 may be accessed by the action prediction application 106 to store data, for example, one or more images, videos, one or more sets of image coordinates, vehicle dynamic data associated with the ego vehicle 102, and the like.

In some embodiments, the storage unit 112 may include one or more object models (not shown) associated with one or more dynamic objects that represent values that include a range of sizes and features (within an image) that are associated to different types of dynamic objects and static objects (e.g., traffic light, street lamps, traffic signs, etc.). In some configurations, the object models may be analyzed by the action prediction application 106 to identify objects and features included within the driving scene as dynamic objects that are located within the driving scene and classified as ego-things or driving scene characteristics that are associated with the driving scene and classified as ego-stuff to thereby generate the ego-thing graph 218 and the ego-stuff graph 220.

In an exemplary embodiment, the storage unit 112 may be configured to additionally store the neural network 108. The neural network 108 may be configured as a convolutional neural network (CNN) that is configured to analyze image frames provided by the vehicle camera system 110. In one embodiment, the neural network 108 may be controlled by a processing unit 116. The processing unit 116 may be configured to provide processing capabilities to be configured to utilize machine learning/deep learning to analyze inputted data in the form of image data and may utilize the I3D 204, the ROIAlign 208, and the MaskAlign 212 to determine data from image frames 202 provided by the vehicle camera system 110 to thereby generate the ego-thing graph 218 and the ego-stuff graph 220.

The neural network 108 may additionally include the encoder LSTM 222 that may be configured as a backbone for the temporal decoder 228 that makes spatial temporal determinations based on the fused data associated with the ego-thing graph 218 and the ego-stuff graph 220. The encoder LSTM module 222 may be configured to aggregate ego features by an element wise summation from the two types of graphs 218, 220 to obtain a 1×D feature vector.

The neural network 108 may also include the temporal decoder 228 that is configured as a temporal recurrent network (TRN). The temporal decoder 228 may be configured to learn a feature representation of the evolving interactions in the driving scene of the ego vehicle 102. The temporal decoder 228 may be further configured to make use of both accumulated historical evidence and predict future information to better recognize actions that are currently occurring with respect to the operation of the ego vehicle 102. More specifically, the temporal decoder 228 is configured to learn a feature representation of the evolving interactions in the driving scene. A future gate receives a vector of hidden states from the temporal decoder 228 and embeds these features via the element-wise summation as an egocentric representation 230 of the driving scene in a future context. As discussed below, the driver stimulus action 232 may be predicted based on a concatenation operation and capturing of spatiotemporal features from historical, current, and predicted future information included within the egocentric representation 230 to predict a driver stimulus action 232 in a next image frame (e.g., at t+1).

With continued reference to FIG. 1, the vehicle systems/control units 114 may be configured to provide one or more alerts, controls, and/or execution one or more autonomous commands associated with the operation of the ego vehicle 102. The vehicle systems/control units 114 may be configured to include, advanced driver-assistance systems that may configured to provide alerts based on the predicted driver stimulus action 232 and predicted driver intention action 234 at one or more future time stamps (e.g., t+1, t+2, t+n). In some embodiments, the vehicle systems/control units 114 may be configured to include an engine control unit, a braking control unit, a transmission control unit, a steering control unit, and the like to control the ego vehicle 102 to be autonomously driven based on autonomous commands that are communicated by the action prediction application 106.

As discussed in more detail below, the action prediction application 106 may be configured to communicate with the vehicle systems/control units 114 to output alerts to be provided to the driver of the ego vehicle 102 based on the predicted driver stimulus action 232 and predicted driver intention action 234 at one or more future time stamps (e.g., t+1, t+2, t+n) based on machine learning/deep learning processing executed by the neural network 108 as utilized by the action prediction application 106, as represented in the framework 200 of FIG. 2.

II. The Driving Scene Modeling Driver Action Prediction Application and Related Methods Components of the action prediction application 106 will now be described according to an exemplary embodiment and with reference to FIG. 1. In an exemplary embodiment, the action prediction application 106 may be stored on the storage unit 112 and executed by the ECU 104 of the ego vehicle 102. In another embodiment, the action prediction application 106 may be stored on an externally hosted computing infrastructure and may be accessed by a telematics control unit (not shown) of the ego vehicle 102 to be executed by the ECU 104 of the ego vehicle 102.

The general functionality of action prediction application 106 will now be discussed. In an exemplary embodiment, the action prediction application 106 may include a plurality of modules 118-124 that may be configured for predicting driving actions based on intent-aware driving models. The plurality of modules 118-124 may include a data reception module 118, a dynamic object detection module 120, a scene characteristic module 122, and a driving action prediction module 124. However, it is appreciated that the action prediction application 106 may include one or more additional modules and/or sub-modules that are included in lieu of the modules 118-124.

Figure 3:
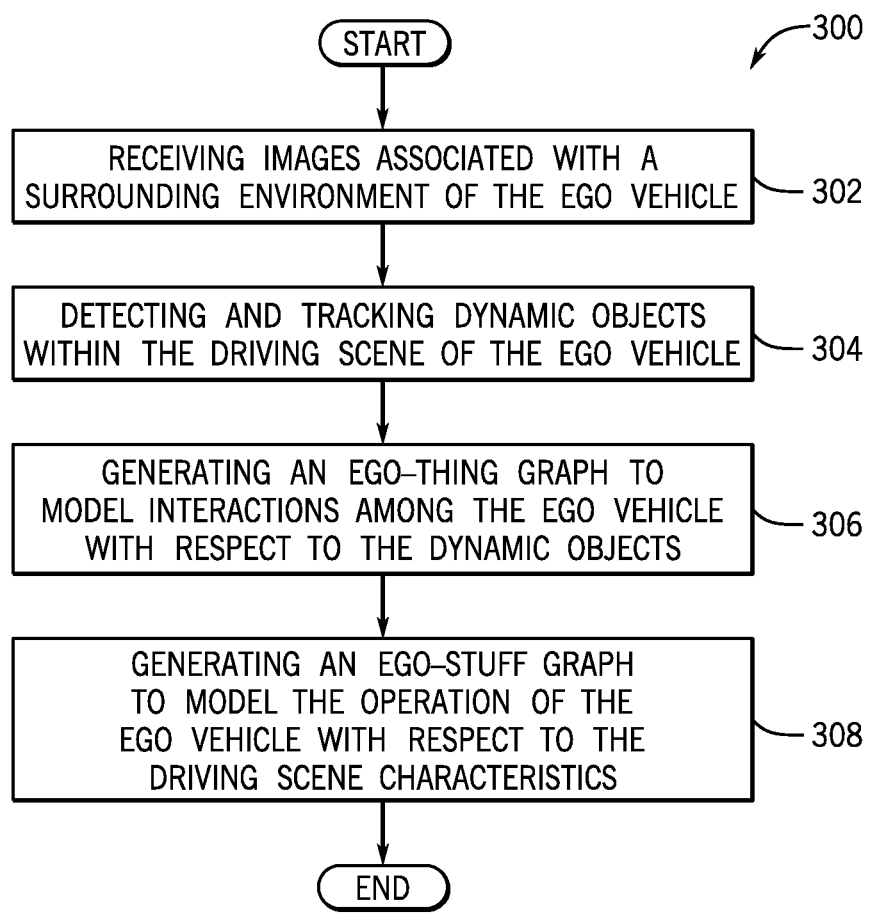
FIG. 3 is a process flow diagram of a method for generating an ego-thing graph and an ego-stuff graph associated with dynamic objects and driving scene characteristics of a driving scene of an ego vehicle according to an exemplary embodiment of the present disclosure.

FIG. 3 is a process flow diagram of a method 300 for generating an ego-thing graph 218 and an ego-stuff graph 220 associated with the dynamic objects and driving scene characteristics of the driving scene of the ego vehicle 102 according to an exemplary embodiment of the present disclosure. FIG. 3 will be described with reference to the components of FIG. 1 and FIG. 2 though it is to be appreciated that the method 300 of FIG. 3 may be used with other systems/components. The method 300 may begin at block 302, wherein the method 300 may include receiving images associated with a surrounding environment of the ego vehicle 102.

In an exemplary embodiment, the data reception module 118 of the action prediction application 106 may be configured to receive image data that may be associated with images captured of the surrounding environment of the ego vehicle 102 that may be provided by the vehicle camera system 110 of the ego vehicle 102. As discussed above, the image data may pertain to one or more RGB images/video of the dynamic objects and driving scene characteristics that are located within the surrounding environment of the ego vehicle 102 that are captured by one or more cameras that are operably connected to the vehicle camera system 110. In some embodiments, the data reception module 118 may package and store the image data on the storage unit 112 to be evaluated at one or more points in time.

The method 300 may proceed to block 304, wherein the method 300 may include detecting and tracking dynamic objects within the driving scene of the ego vehicle 102. In one embodiment, the data reception module 118 may be configured to evaluate the image data and may extract image frames 202 from the image data that include the driving scene of the ego vehicle 102. In one embodiment, the data reception module 118 may be configured to input the image frames 202 to the neural network 108 to be analyzed by I3D 204. The I3D 204 is configured to apply instance segmentation and semantic segmentation 210 to detect dynamic objects located within the driving scene and the driving scene characteristics of the driving scene. As discussed above, the dynamic objects may be classified as ego-things and the dynamic scene characteristics may be classified as ego-stuff.

With respect to the ego-things, the neural network 108 may be configured to evaluate a particular image frame captured at time t, a plurality of image frames captured before the time t (e.g., t−1, t−2, t−n) and a plurality of image frames captured after the present time t (e.g., t+1, t+2, t+n) to detect one or more driving behaviors of the ego vehicle 102 that may include, but may not be limited to, stopping, continuing to go/accelerating, driving straight, turning right, turning left, merging right, merging left, and the like. The data reception module 118 may additionally be configured to utilize the neural network 108 to detect and track the one more dynamic objects and classified them as ego-things that may be located within the driving scene of the ego vehicle 102 captured within the image frame at the time t.

Figure 4A:
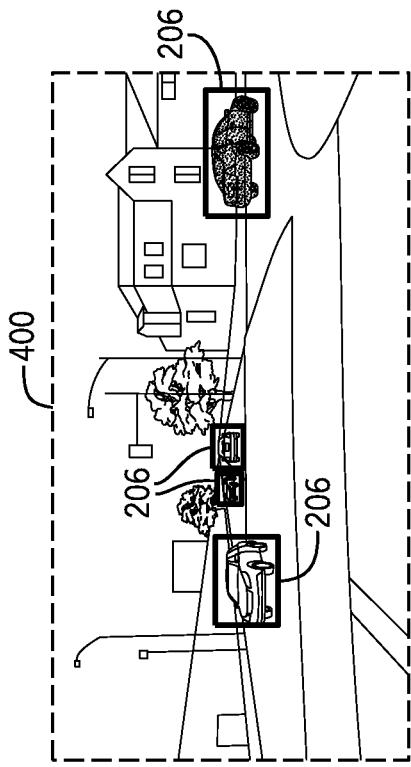
FIG. 4A is a first illustrative example of dynamic objects located within the driving scene of the ego vehicle according to an exemplary embodiment of the present disclosure.
Figure 4B:
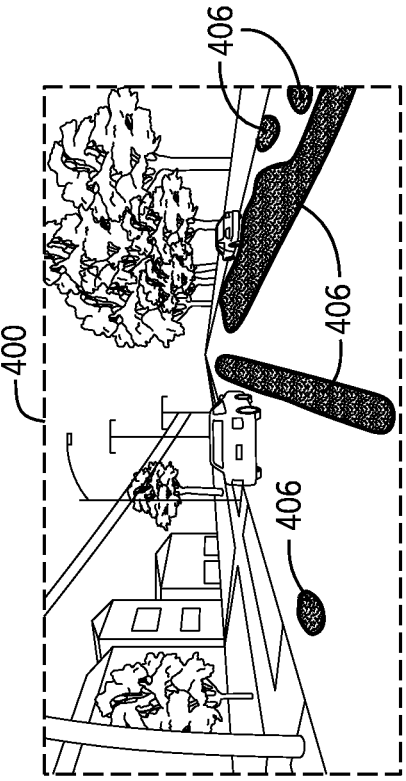
FIG. 4B is a second illustrative example of dynamic objects located within the driving scene of the ego vehicle according to an exemplary embodiment of the present disclosure.

In particular, the data reception module 118 may be configured to utilize the neural network 108 to compute respective bounding boxes 206 around each of the dynamic objects included within the image frame. ROIAlign 208 may be employed to extract dynamic object features. As shown in FIG. 4A and FIG. 4B, the neural network 108 may be configured to execute machine learning/deep learning processing to provide a one-channel binary mask on subsets of pixels of each of the image frames 202 that are encapsulated within each of the bounding boxes 206 that include each of the dynamic objects located within the driving scene 400.

In an exemplary embodiment, the neural network 108 may complete image inpainting to electronically remove and replace each of pixels associated with each of the dynamic objects independently, such that each dynamic object included within each respective bounding box 206 is singularly removed and its removal is analyzed to output a level of driving behavior change with respect to the particular removed dynamic object. In particular, the image inpainting executed by the neural network 108 is based on a masked and re-normalized convolution operation that enables a hallucination in the masked area because convolutional results depend only on the non-masked regions at every layer. The operation thereby enables removing each dynamic object independently for intervention.

In one embodiment, the neural network 108 may thereby output a predicted causality score of two alternative driving behaviors (e.g., stop/go) and may analyze the driving scene 400 to determine a level of change pertaining to the two driving behaviors with the presence of the dynamic object and without the presence of dynamic object as it's electronically removed from the driving scene 400 included in the image frame. In other words, the dynamic object detection module 120 may analyze a level of change associated with a driving behavior with respect to the removal of each of the dynamic objects and may thereby assign a causality score that is associated with a causal relationship with the driving behavior based on the level of change.

The causality score may be associated with the causal relationship between the presence of each dynamic object and the particular driving behavior (e.g., stop vs. go) based on the level of change associated with the electronical removal of each of the dynamic objects (e.g., if not for the presence of the particular dynamic object, the ego vehicle 102 would not stop and would go). The neural network 108 may further classify the one or more respective objects that are assigned the highest causality score as risk objects. In other words, the neural network 108 may classify one or more dynamic objects that cause the most substantial causal effect with respect to the driving behavior as a risk object.

Accordingly, when a prediction occurs, such as a stop prediction with respect to the operation of the ego vehicle 102, the neural network 108 intervenes an input image by removing a tracklet at a time and inpainting the removed area in each image frame to simulate the driving scene without the presence of the tracklet. The trained driving model is then used to predict the effect of the removal. A large-scale naturalistic driving dataset (not shown) may thereby be populated and maintained by the neural network 108 to be used to predict a driver stimulus action 232.

With continued reference to the method 300 of FIG. 3, the method 300 may proceed to block 306, wherein the method 300 may include generating an ego-thing graph to model interactions among the ego vehicle 102 with respect to the dynamic objects. In an exemplary embodiment, upon the neural network 108 populating the naturalistic driving dataset, the neural network 108 may communicate data pertaining to the update of the naturalistic driving dataset to the dynamic object detection module 120 of the action prediction application 106. In one embodiment, upon the extraction of object features via the ROIAlign 208, the neural network 108 may be configured to keep the top K dynamic object detections on each image frame from dynamic object classes that may include, but may not be limited to, car, pedestrian, bicycle, motorcycle, bus, train, and truck. The ROIAlign 208 and a max pooling layer are applied to obtain 1×D dimensional appearance features as Thing Node features of the ego-thing graph 218 based on an operation of the graph generator 214.

With respect to the ego-thing graph 218, the graph generator 214 may be configured to denote the sequence of frame-wise ego-thing graphs as $G^{ET}=\{G_t^{ET}|t=1, \ldots T\}$, where T is the number of frames, and $G_t^{ET} \in \mathbb{R}^{(K+1)\times(K+1)}$ is an ego-thing affinity matrix at frame t representing the pair-wise interactions among thing-objects and the ego vehicle 102. Specifically, $G_t^{ET}(i, j)$ denotes the influence of dynamic object j on dynamic object i. Thing nodes in the ego-thing graph 218 correspond to a set of dynamic objects $\{(x_i^t, p_i^t)|i=1, \ldots K+1\}$, where $x_i^t \in \mathbb{R}^D$ is i-th dynamic object's appearance feature, and $p_i^t \in \mathbb{R}^3$ is the 3D location of the dynamic object in world frame. The index K+1 corresponds to the ego vehicle 102 and i=1, . . . , K correspond to dynamic objects located within the driving scene, classified as thing-objects of the ego-thing graph 218.

Ego-thing interactions (i.e., the interactions between one or more of the dynamic objects within the driving scene) are defined as second-order interactions, where not only the original state but also the changing state of the thing-object caused by other objects will altogether influence the ego state. To sufficiently model these interactions, the neural network 108 considered both appearance features and distance constraints and an edge value $G_t^{ET}(i, j)$ is computed as:

$$G_t^{ET}(i, j) = \frac{f_s(p_i^t, p_j^t)\exp(f_a(x_i^t, x_j^t))}{\sum_{j=1}^{K+1} f_s(p_i^t, p_j^t)\exp(f_a(x_i^t, x_j^t))} \quad (1)$$

where $f_a(x_i^t, x_j^t)$ indicates the appearance relation between two dynamic objects. A distance constraint is setup via a spatial relation $f_s(p_i^t, p_j^t)$. A softmax function is used to normalize the influence on dynamic object i from other dynamic objects located within the driving scene. The appearance relation is calculated as below:

$$f_a(x_i^t, x_j^t) = \frac{\varkappa(x_i^t)^T \varkappa'(x_j^t)}{\sqrt{D}} \quad (2)$$

where $\varphi(xt_i)=wx_i^t$ and $\varphi'(xj)=w'x_j^t$. Both $w \in \mathbb{R}^{D \times D}$ and $w' \in \mathbb{R}^{D \times D}$ are learnable parameters which map appearance features to a subspace and enable learning the correlation of two objects. $\sqrt{D}$ is a normalization factor.

The necessity of defining spatial relation arises from that the interactions of two distant objects are usually scarce. To calculate this relation, the neural network 108 may unproject objects from the 2D image plane to the 3D space in the world frame:

$$[xyz1]^T = \delta_{u,v} P^{-1}[uv1]^T \quad (3)$$

where $[u\ v\ 1]^T$ and $[x\ y\ z\ 1]^T$ are homogeneous representations in 2D and 3D coordinate systems, P is the camera intrinsic matrix, and $\delta_{u,v}$ is the relative depth at (u, v) obtained by depth estimation.

In the 2D plane, the centers of bounding boxes 206 are chosen to locate the dynamic objects. The location of the ego vehicle 102 is fixed at the middle-bottom pixel of each of the image frame 202. The spatial relation function $f_s$ is thereby formulated as:

$$f_s(p_i^t, p_j^t) = \mathbb{I}_{(d(p_i^t, p_j^t) \leq \mu)} \quad (4)$$

where $\mathbb{I}(\bullet)$ is the indicator function, $d(p_i^t, p_j^t)$ computes the Euclidean distance between the dynamic object i and the dynamic object j in the 3D space, and µ is the distance threshold which regulates the spatial relation value to be zero if the distance is beyond an upper bound. In an exemplary embodiment, upon generating the ego-thing graph 218, the neural network 108 may communicate data pertaining to the ego-thing graph 218 to the dynamic object detection module 120. The dynamic object detection module 120 may communicate data pertaining to the generated ego-thing graph 218 to the scene characteristic module 122 of the action prediction application 106.

With continued reference to the method 300 of FIG. 3, the method 300 may proceed to block 308, wherein the method 300 may include generating an ego-stuff graph 220 to model the operation of the ego vehicle 102 with respect to the driving scene characteristics. In an exemplary embodiment, upon receiving the communication of the generation of the ego-thing graph 218 by the dynamic object detection module 120, the scene characteristic module 122 may communicate with the neural network 108 to generate the ego-stuff graph 220 associated with the driving scene characteristics of the driving scene.

In one embodiment, the neural network 108 may execute the I3D 204 to perform semantic segmentation 210 upon each of the image frames 202 to thereby identify the driving scene characteristics of the driving scene captured within the image frames. The semantic segmentation 210 may thereby allow driving scene characteristics to be detected to further identify static objects and other roadway features such as road markings (e.g., lane markers, yield markers, stop markers), traffic lights (e.g., red light, yellow light, green light), traffic signage (e.g., stop sign, yield sign), that are located within the driving scene.

Figure 4C:
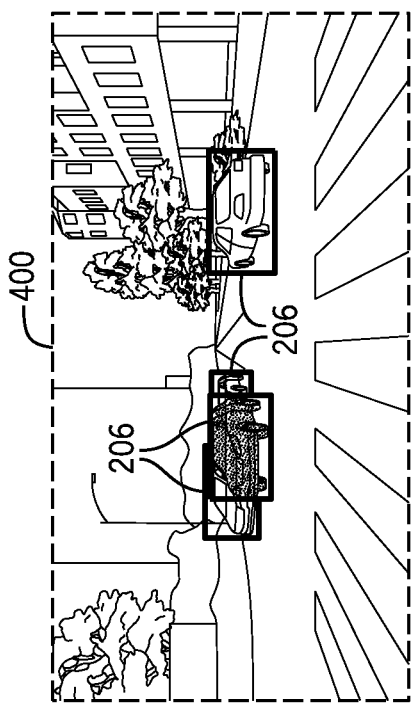
FIG. 4C is a first illustrative example of driving scene characteristics included within the driving scene of the ego vehicle according to an exemplary embodiment of the present disclosure.
Figure 4D:
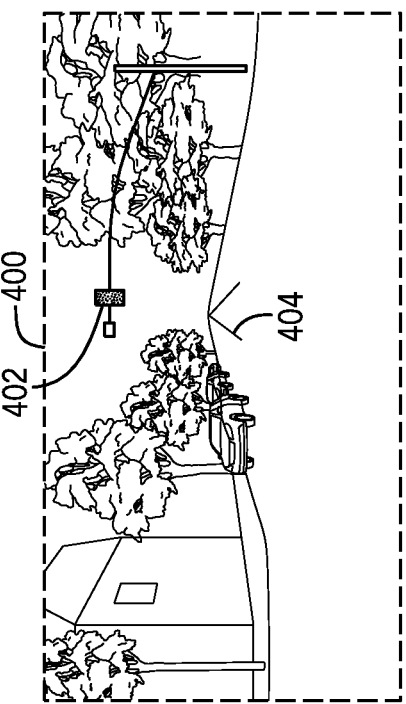
FIG. 4D is a second illustrative example of driving scene characteristics included within the driving scene of the ego vehicle according to an exemplary embodiment of the present disclosure.

As shown in the illustrative examples of FIGS. 4C and 4D, the neural network 108 may identify static objects such as traffic lights 402, road markers 404, roadway dividers 406, and the like that are included within the driving scene 400 based on analysis if change of states may be caused and/or objects may be encapsulated within bounding boxes. In particular, in one embodiment, the criterion used to distinguish driving scene characteristics that are classified as stuff-objects from dynamic objects that are classified thing-objects is based on whether the change of states can be caused by other objects. For example, cars stop and yield to a person, but a traffic light turns red to green by itself. Another distinction lies in that the contour of most stuff-objects cannot be well depicted as rectangular bounding boxes.

The neural network 108 may thereby classify the identified driving scene characteristics 402, 404, 406 as stuff-objects. The neural network 108 may utilize MaskAlign 212 to extract features for a binary mask $M_i^t$, which is the i-th stuff object at time t. $M_i^t$ is downsampled to $M_i^{t'}$(W×H) with the same spatial dimension as the intermediate I3D feature map X (T×W×H×D). The stuff object feature is computed by MaskAlign 212 as following:

$$x_i^t = \frac{\sum_{w=1}^{W} \sum_{h=1}^{H} X_{(w,h)}^t \cdot M_{i(w,h)}^{t'}}{\sum_{w=1}^{W} \sum_{h=1}^{H} M_{i(w,h)}^{t'}} \quad (5)$$

With particular reference to the ego-stuff graph 220, the ego-stuff graph 220 $G^{ES}$ is generated by the graph generator 216 in a similar manner as the ego-thing graph 218 $G^{ET}$ in Eq. 1 above, except for node feature extraction, as the change of states of ego-things (dynamic objects) are bi-directional rather than independent with respect to the ego-stuff (driving scene characteristics), as discussed above. Accordingly, only the effect of the ego-stuff has on the operation of the ego vehicle 102 itself is taken into account within the ego-stuff graph 220.

As such, the neural network 108 may set $f_s$ to zeros for every pair of stuff-objects and may pay attention to the influence that stuff-objects act upon the operation of the ego vehicle 102. This analysis may be referred to as first-order interaction. To better model the spatial relations, instead of unprojecting bounding box centers, the neural network 108 may map every pixel inside the downsampled binary mask $M_i^{t'}$ to 3D space and may further calculate the Euclidean distance between every pixel with the ego vehicle 102. The distance is the minimum distance of all of the pixels.

Figure 5:
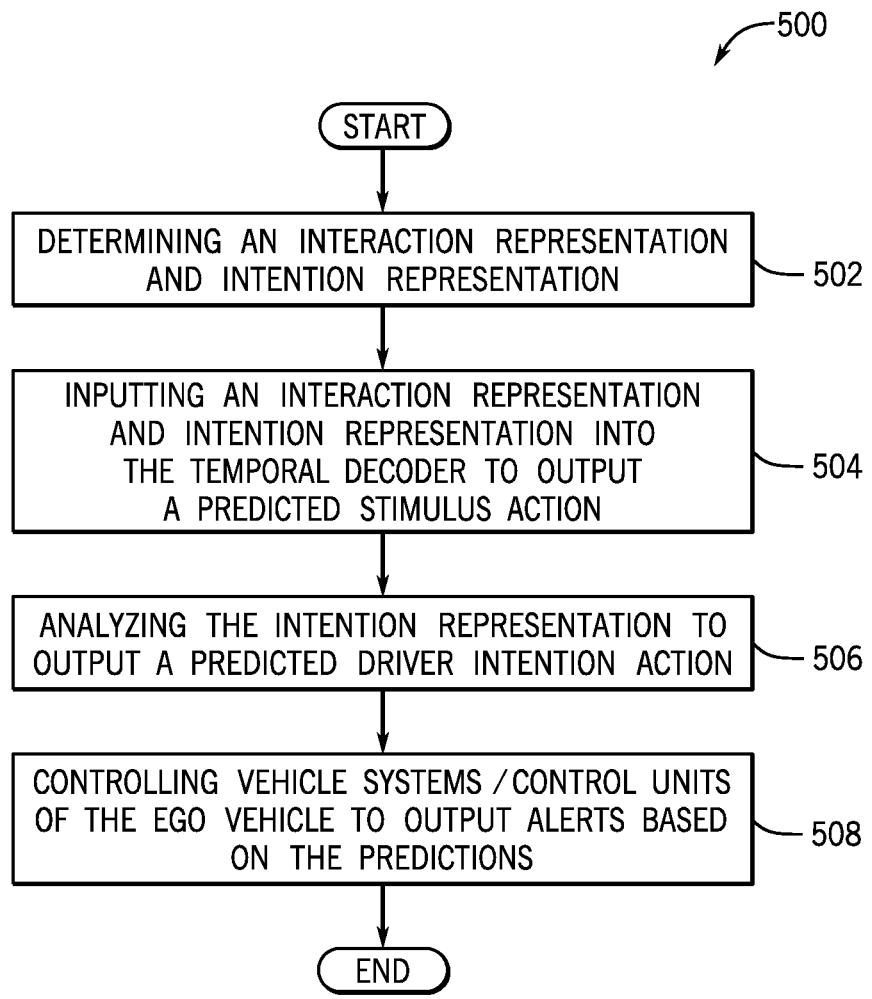
FIG. 5 is a process flow diagram of a method for determining an egocentric representation to output a driver stimulus action and a driver intention action according to an exemplary embodiment of the present disclosure.

FIG. 5 is a process flow diagram of a method 500 for determining an egocentric representation 230 to output a driver stimulus action 232 and a driver intention action 234 according to an exemplary embodiment of the present disclosure. FIG. 5 will be described with reference to the components of FIG. 1 and FIG. 2 though it is to be appreciated that the method 500 of FIG. 5 may be used with other systems/components. The method 500 may begin with block 502, wherein the method 500 may include determining an interaction representation and intention representation.

In particular, to perform reasoning on the graphs 218, 220, the neural network 108 may be configured to include graph convolutional networks (GCN). The GCN make take each graph 218, 220 as an input and may pass information through learned edges, and refresh nodes' features as output. Specifically, graph convolution may be expressed as:

$$X^{l+1} = GZ^l W^l + Z^l \quad (6)$$

where G is the affinity matrix from the graphs 218, 220. Taking the ego-thing graph 218 as an example, $Z^l \in \mathbb{R}^{(K+1) \times D}$ is the appearance feature matrix of nodes in the l-th layer. $W^l \in \mathbb{R}^{D \times D}$ is the learnable weight matrix. A residual connection is built by adding $Z^l$. In the end of each layer, Layer Normalization is adopted and ReLU before $Z^{l+1}$ is fed to the next layer.

In an exemplary embodiment, ego-thing features extracted from the ego-thing graph 218 and ego-stuff features extracted from the ego-stuff graph 220 may and fused to accomplish spatial-temporal driving scene modeling of the driving scene of the ego vehicle 102. Upon fusion of the ego-features extracted from the graphs 218, 220, fused data is processed via the encoder LSTM 222 to make spatial temporal determinations based on the fused data to determine the interaction representation 224. In one configuration, ego features from the ego-thing graph 218 and the ego-stuff graph 220 are aggregated by element-wise summation and fed into the encoder LSTM 222 to obtain a 1×D feature vector as the interaction representation 224. Accordingly, the interaction representation 224 captures the interactions between the dynamic objects amongst one another and with the ego vehicle 102 over a timeframe captured within the image frames t−n, t−2, t−1, t, t+1, t+2, t+n.

In one embodiment, the intention representation 226 is determined from the I3D 204 such that the intention of the driver of the ego vehicle 102 is captured within the image frames 202 based on one or more actions of the ego vehicle 102, a lane in which the ego vehicle 102 is traveling, a trajectory of the ego vehicle 102, and the status of one or more ego-stuff (e.g., right turn traffic light).

The method 500 may proceed to block 504, wherein the method 500 may include inputting the interaction representation and intention representation into the temporal decoder 228 to output a predicted driver stimulus action 232. In an exemplary embodiment, the driving action prediction module 124 of the action prediction application 106 may be configured to send a command to the neural network 108 to input the interaction representation 224 and the intention representation 226 to the temporal decoder 228 to add a temporal context by aggregating the intention representation 226 outputted by the I3D 204 with interactive features associated with the interaction representation 224.

Figure 6:
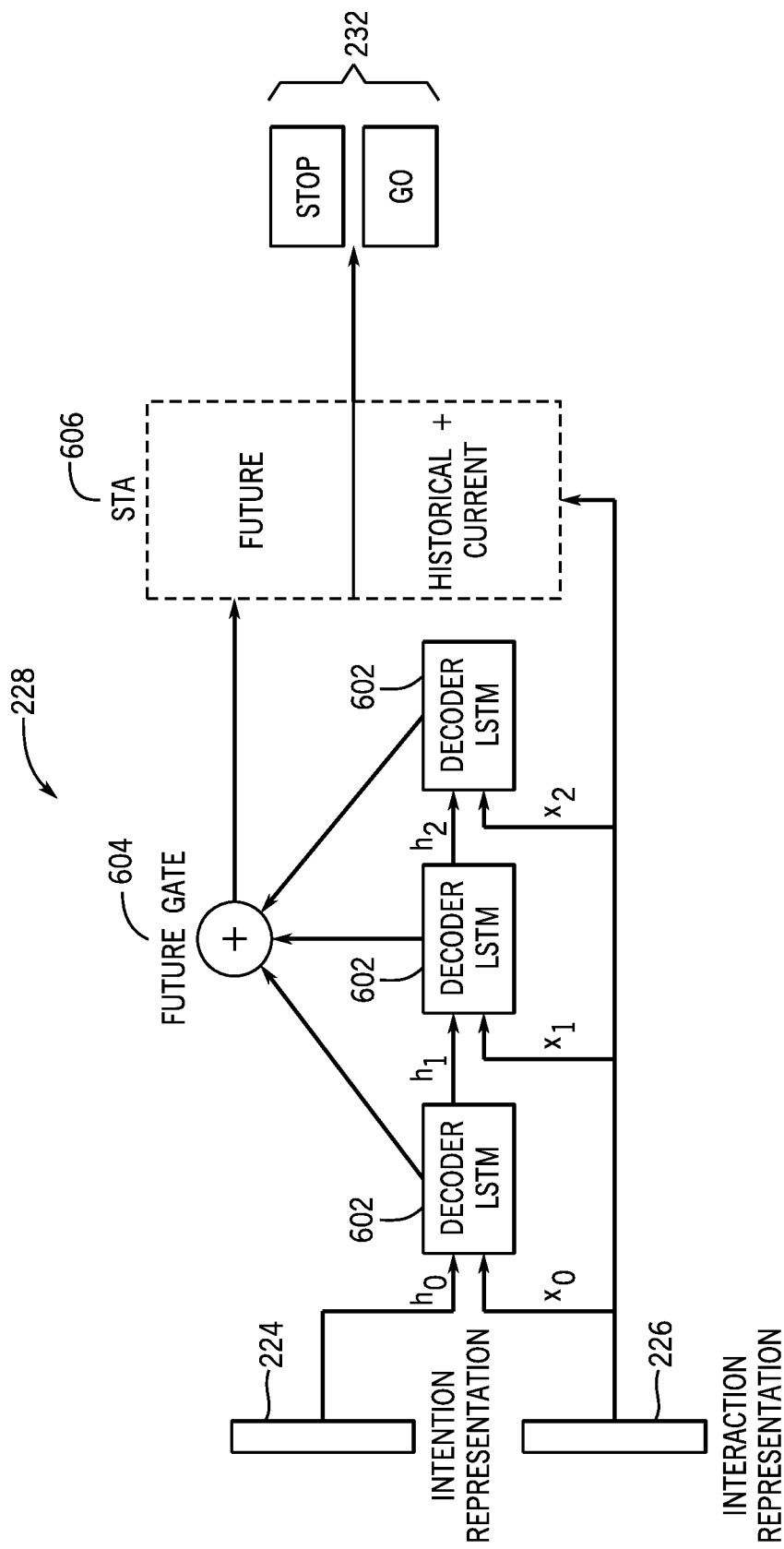
FIG. 6 is a schematic overview of a structure of a temporal decoder according to an exemplary embodiment of the present disclosure.

As shown in FIG. 6, a schematic overview of the structure of the temporal decoder 228, the intention representation 226 and the interaction representation 224 are inputted to the temporal decoder 228. The intention representation 226 serves as the initial hidden state to a decoder LSTM 602. A future gate 604 and spatiotemporal accumulator (STA) 606 aggregate futures from historical, current, and predicted future information to estimate the driver stimulus action 232, shown as stop and go as an illustrative example.

In particular, the temporal decoder 228 learns a feature representation of the evolving interactions in the driving scene. The future gate 604 receives a vector of hidden states from the temporal decoder 228 and embeds these features via the element wise summation as the future context. The STA 606 is a concentration operation and captures the spatiotemporal features from historical, current, and predicted future information, and estimates the driver stimulus action 232 occurring in the next frame (e.g., at t+1).

Referring again to the method 500 of FIG. 5, the method 500 may proceed to block 506, wherein the method 500 may include analyzing the intention representation 226 to output a predicted driver intention action 234. In an exemplary embodiment, the neural network 108 may enable the intention representation 226 of the driver's intention to be analyzed to estimate the importance of the dynamic objects and assess riskiness. The neural network 108 may be configured to incorporate the intention information by using the intention representation 226 from the I3D 204 as the initialized hidden state to the first decoder LSTM 602 of the temporal decoder 228. The neural network 108 uses this intention representation to predict the ego vehicle's intention action, which is supervised by cross-entropy loss which is combined with the stimulus action loss as a total loss.

The method 500 may proceed to block 508, wherein the method 500 may include controlling vehicle systems/control units of the ego vehicle 102 to output alerts based on the predictions. In an exemplary embodiment, upon the prediction of the driver stimulus action 232 and/or the driver intention action 234, the neural network 108 may communicate data pertaining to the predictions to the driving action prediction module 124 of the action prediction application 106. In one embodiment, the action prediction application 106 may be configured to communicate with the ECU 104 of the ego vehicle 102 to operably control one or more vehicle systems/control units 114 to provide one or more alerts based on the predictions of the driver stimulus action 232 and/or the driver intention action 234 to alert the driver of the ego vehicle 102 of potential overlap with dynamic objects and/or static objects within the driving scene based on the predicted actions 232, 234. The vehicle systems/control units 114 may be configured to include, advanced driver-assistance systems that may configured to provide alerts based on the predicted driver stimulus action 232 and the predicted driver intention action 234 at a predetermined timeframe before one or more future time stamps (e.g., t+1, t+2, t+n) to enable the driver to complete one or more driving maneuvers to avoid any potential overlap.

In an alternate embodiment, the driving action prediction module 124 may be configured to communicate with the ECU 104 of the ego vehicle 102 to autonomously or semi-autonomously control operation of the ego vehicle 102 based on the predictions of the driver stimulus action 232 and/or the driver intention action 234 to avoid any potential overlap with dynamic objects and/or static objects within the driving scene. Accordingly, the ECU 104 may communicate with the one or more vehicle systems/control units 114 to thereby control the ego vehicle 102 to perform one or more maneuvers to travel within the driving scene at a respective speed, braking rate, steering rate, acceleration rate, and the like that avoids overlap with static objects and/or dynamic objects in accordance with the driving scene characteristics of the driving scene (e.g., number of lanes, navigable pathways based on lane markings, traffic light status).

Figure 7:
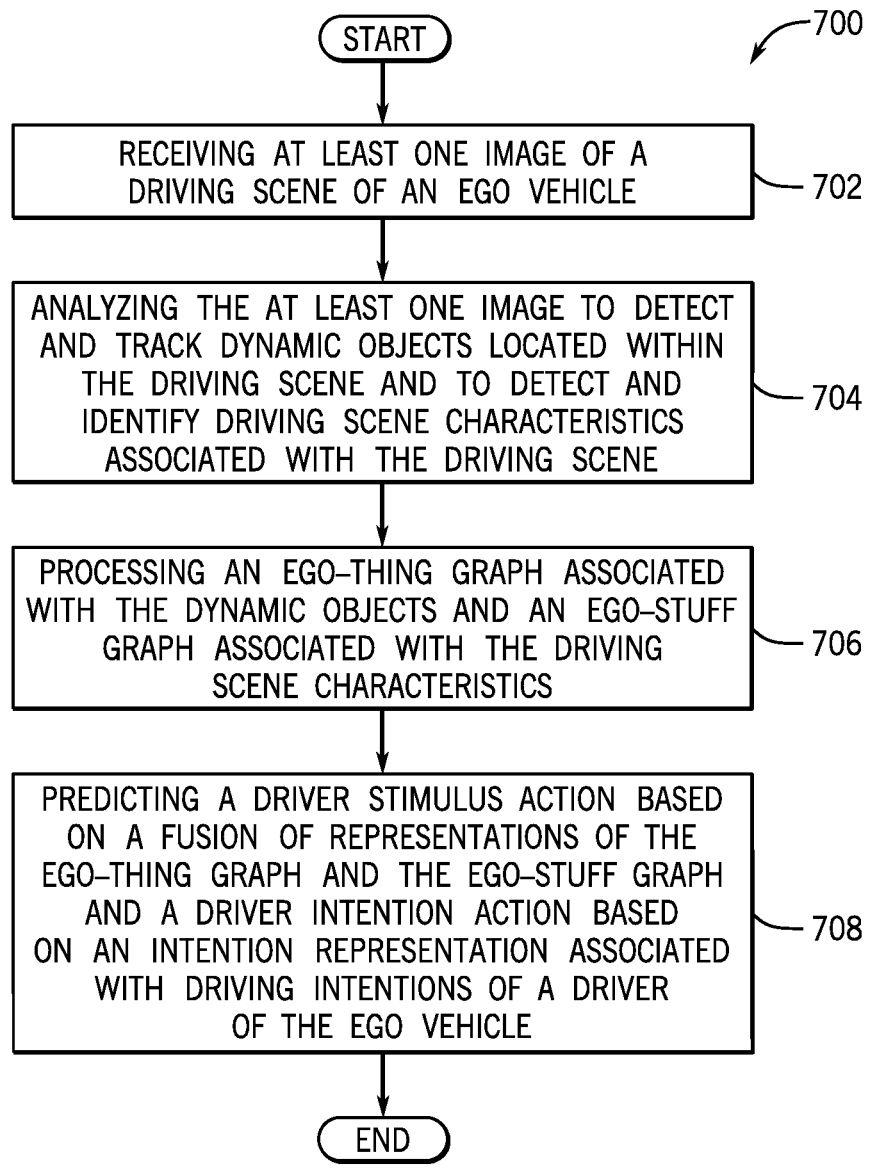
FIG. 7 is a process flow diagram of a method for predicting driving actions based on intent-aware driving models according to an exemplary embodiment of the present disclosure.

FIG. 7 is a process flow diagram of a method 700 for predicting driving actions based on intent-aware driving models according to an exemplary embodiment of the present disclosure. FIG. 7 will be described with reference to the components of FIG. 1 and FIG. 2 though it is to be appreciated that the method 700 of FIG. 7 may be used with other systems/components. The method 700 may begin at block 702, wherein the method 700 may include receiving at least one image of a driving scene of an ego vehicle 102.

The method 700 may proceed to block 702, wherein the method 700 may include receiving at least one image of a driving scene of an ego vehicle 102. The method 700 may proceed to block 704, wherein the method 700 may include analyzing the at least one image to detect and track dynamic objects located within the driving scene and to detect and identify driving scene characteristics associated with the driving scene. The method 700 may proceed to block 706, wherein the method 700 may include processing an ego-thing graph associated with the dynamic objects and an ego-stuff graph associated with the driving scene characteristics. The method 700 may proceed to block 708, wherein the method 700 may include predicting a driver stimulus action 232 based on a fusion of representations of the ego-thing graph and the ego-stuff graph and a driver intention action 234 based on an intention representation associated with driving intentions of a driver of the ego vehicle.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for predicting driving actions based on intent-aware driving models:
   receiving at least one image of a driving scene of an ego vehicle;
   analyzing the at least one image to detect and track dynamic objects located within the driving scene and to detect and identify driving scene characteristics associated with the driving scene, wherein each of the dynamic objects whose presence are influenced by an operation of the ego vehicle is classified as an ego-thing, wherein static objects and roadway features of the driving scene are classified as ego-stuff;
   processing an ego-thing graph associated with classified ego-things and an ego-stuff graph associated with classified ego-stuff, and
   predicting a driver stimulus action based on a fusion of representations of the ego-thing graph and the ego-stuff graph and a driver intention action based on an intention representation associated with driving intentions of a driver of the ego vehicle, wherein outputs of both the ego-thing graph and the ego-stuff graph are fused and passed through an encoder to form an interaction representation of the driving scene and the interaction representation and the intention representation are aggregated through a temporal decoder to predict the driver stimulus action.

2. The computer-implemented method of claim 1, wherein receiving the at least one image of the driving scene of the ego vehicle includes utilizing a neural network to receive inputs of image frames associated with the at least one image of the driving scene, wherein the image frames include egocentric views of the driving scene.

3. The computer-implemented method of claim 1, wherein analyzing the at least one image includes computing object bounding boxes associated with the dynamic objects and extracting dynamic object features from the computed object bounding boxes.

4. The computer-implemented method of claim 1, wherein analyzing the at least one image includes performing semantic segmentation to detect the driving scene characteristics associated with the static objects and the roadway features of the driving scene, wherein features of irregular shaped objects from semantic masks are applied based on the semantic segmentation to identify the driving scene characteristics.

5. The computer-implemented method of claim 1, wherein processing the ego-thing graph includes executing a graph generator of a neural network to compute the ego-thing graph with thing nodes that correspond to the dynamic objects whose presence are influenced by an operation of the ego vehicle, wherein the ego-thing graph pertains to interactions between the dynamic objects amongst one another and with the ego vehicle in a bi-directional manner.

6. The computer-implemented method of claim 1, wherein processing the ego-stuff graph includes executing a graph generator of a neural network to compute the ego-stuff graph with stuff nodes that correspond to the static objects and the roadway features of the driving scene, wherein the ego-stuff graph pertains to an effect of the ego-stuff upon an operation of the ego vehicle.

7. The computer-implemented method of claim 1, wherein predicting the driver stimulus action includes extracting and fusing ego-thing features from the ego-thing graph and ego-stuff features from the ego-stuff graph to accomplish spatial-temporal driving scene modeling of the driving scene, wherein fused data is processed to make spatial temporal determinations to output the interaction representation that captures bidirectional interactions among the dynamic objects with respect to one another and the ego vehicle.

8. The computer-implemented method of claim 7, wherein predicting the driver stimulus action includes inputting the interaction representation and the intention representation that pertains to driver intentions associated with extracted visual features of the driving scene into the temporal decoder of a neural network, wherein the temporal decoder aggregates futures from historical, current, and predicted future information to predict the driver stimulus action.

9. The computer-implemented method of claim 1, wherein predicting the driver intention action includes analyzing the intention of the driver of the ego vehicle based on an extraction of visual features using convolutional analysis of the at least one image to output the intention representation, wherein the driver intention action is associated with driver intentions with respect to a future operation of the ego vehicle.

10. A system for predicting driving actions based on intent-aware driving models comprising:
    a memory storing instructions when executed by a processor cause the processor to:
    receive at least one image of a driving scene of an ego vehicle;
    analyze the at least one image to detect and track dynamic objects located within the driving scene and to detect and identify driving scene characteristics associated with the driving scene, wherein each of the dynamic objects whose presence are influenced by an operation of the ego vehicle is classified as an ego-thing, wherein static objects and roadway features of the driving scene are classified as ego-stuff;
    process an ego-thing graph associated with classified ego-things and an ego-stuff graph associated with classified ego-stuff, and
    predict a driver stimulus action based on a fusion of representations of the ego-thing graph and the ego-stuff graph and a driver intention action based on an intention representation associated with driving intentions of a driver of the ego vehicle, wherein outputs of both the ego-thing graph and the ego-stuff graph are fused and passed through an encoder to form an interaction representation of the driving scene and the interaction representation and the intention representation are aggregated through a temporal decoder to predict the driver stimulus action.

11. The system of claim 10, wherein receiving the at least one image of the driving scene of the ego vehicle includes utilizing a neural network to receive inputs of image frames associated with the at least one image of the driving scene, wherein the image frames include egocentric views of the driving scene.

12. The system of claim 10, wherein analyzing the at least one image includes computing object bounding boxes associated with the dynamic objects and extracting dynamic object features from the computed object bounding boxes.

13. The system of claim 10, wherein analyzing the at least one image includes performing semantic segmentation to detect the driving scene characteristics associated with the static objects and the roadway features of the driving scene, wherein features of irregular shaped objects from semantic masks are applied based on the semantic segmentation to identify the driving scene characteristics.

14. The system of claim 10, wherein processing the ego-thing graph executing a graph generator of a neural network to compute the ego-thing graph with thing nodes that correspond to the dynamic objects whose presence are influenced by an operation of the ego vehicle, wherein the ego-thing graph pertains to interactions between the dynamic objects amongst one another and with the ego vehicle in a bi-directional manner.

15. The system of claim 10, wherein processing the ego-stuff graph includes executing a graph generator of a neural network to compute the ego-stuff graph with stuff nodes that correspond to the static objects and the roadway features of the driving scene, wherein the ego-stuff graph pertains to an effect of the ego-stuff upon an operation of the ego vehicle.

16. The system of claim 10, wherein predicting the driver stimulus action includes extracting and fusing ego-thing features from the ego-thing graph and ego-stuff features from the ego-stuff graph to accomplish spatial-temporal driving scene modeling of the driving scene, wherein fused data is processed to make spatial temporal determinations to output the interaction representation that captures bidirectional interactions among the dynamic objects with respect to one another and the ego vehicle.

17. The system of claim 16, wherein predicting the driver stimulus action includes inputting the interaction representation and the intention representation that pertains to driver intentions associated with extracted visual features of the driving scene into the temporal decoder of a neural network, wherein the temporal decoder aggregates futures from historical, current, and predicted future information to predict the driver stimulus action.

18. The system of claim 10, wherein predicting the driver intention action includes analyzing the intention of the driver of the ego vehicle based on an extraction of visual features using convolutional analysis of the at least one image to output the intention representation, wherein the driver intention action is associated with driver intentions with respect to a future operation of the ego vehicle.

19. A non-transitory computer readable storage medium storing instructions that when executed by a computer, which includes a processor perform a method, the method comprising:
receiving at least one image of a driving scene of an ego vehicle;
analyzing the at least one image to detect and track dynamic objects located within the driving scene and to detect and identify driving scene characteristics associated with the driving scene, wherein each of the dynamic objects whose presence are influenced by an operation of the ego vehicle is classified as an ego-thing, wherein static objects and roadway features of the driving scene are classified as ego-stuff;
processing an ego-thing graph associated with classified ego-things and an ego-stuff graph associated with classified ego-stuff, and
predicting a driver stimulus action based on a fusion of representations of the ego-thing graph and the ego-stuff graph and a driver intention action based on an intention representation associated with driving intentions of a driver of the ego vehicle, wherein outputs of both the ego-thing graph and the ego-stuff graph are fused and passed through an encoder to form an interaction representation of the driving scene and the interaction representation and the intention representation are aggregated through a temporal decoder to predict the driver stimulus action.

20. The non-transitory computer readable storage medium of claim 19, wherein predicting the driver stimulus action includes extracting and fusing ego-thing features from the ego-thing graph and ego-stuff features from the ego-stuff graph to accomplish spatial-temporal driving scene modeling of the driving scene, wherein fused data is processed to make spatial temporal determinations to output the interaction representation that captures bidirectional interactions among the dynamic objects with respect to one another and the ego vehicle.

* * * * *